(12) United States Patent
Batchelor et al.

(10) Patent No.: US 10,255,223 B2
(45) Date of Patent: Apr. 9, 2019

(54) DETECTING A TYPE OF STORAGE ADAPTER CONNECTED AND MISCABLING OF A MICROBAY HOUSING THE STORAGE ADAPTER

(71) Applicant: International Business Machines Corporation, Armonk, NY (US)

(72) Inventors: Gary W. Batchelor, Tucson, AZ (US); Enrique Q. Garcia, Tucson, AZ (US); Jay T. Kirch, Tucson, AZ (US); Trung N. Nguyen, Tucson, AZ (US); Todd C Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 15/369,710

(22) Filed: Dec. 5, 2016

(65) Prior Publication Data

US 2018/0160561 A1    Jun. 7, 2018

(51) Int. Cl.
*G06F 13/00* (2006.01)
*G06F 13/40* (2006.01)

(52) U.S. Cl.
CPC ................ *G06F 13/4068* (2013.01)

(58) Field of Classification Search
CPC .. G06F 13/4282; G06F 13/20; G06F 12/0831; G06F 13/385; G06F 13/4068; G06F 13/4221; G06F 2213/0026; G06F 11/2247; G06F 11/3051; G06F 13/00
See application file for complete search history.

(56) References Cited

U.S. PATENT DOCUMENTS

| 9,152,591 B2 | 10/2015 | Galles et al. |
| 9,418,033 B2 * | 8/2016 | Remple ............... G06F 13/4291 |
| 9,697,155 B2 * | 7/2017 | Arroyo ............... G06F 9/44505 |
| 2014/0052889 A1 | 2/2014 | Klinglesmith et al. |

(Continued)

OTHER PUBLICATIONS

"PCIe Over Cable Goes Mainstream" (online) retrieved from the Internet on Dec. 1, 2016, at URL>http://www.onestopsystems.com/blog-post/pcie-over-cable-goes-mainstream, Total 11 pages.

(Continued)

*Primary Examiner* — Idriss N Alrobaye
*Assistant Examiner* — Richard B Franklin
(74) *Attorney, Agent, or Firm* — Janaki K. Davda; Konrad, Raynes, Davda and Victor LLP

(57) ABSTRACT

Provided are techniques for detecting a type of storage adapter connected to an Input/Output (I/O) bay and miscabling of a microbay housing the storage adapter. Under control of an Input/Ouput (I/O) bay, cable sidebands are driven high for a predetermined period of time. It is determined whether a cable sidebands response has been detected that indicates that the cable sidebands have been driven low. In response to determining that the cable sidebands response has been detected, it is determined that the I/O bay is connected to a first storage adapter supporting a first protocol for the cable sidebands. In response to determining that the cable sidebands response has not been detected, it is determined that the I/O bay is connected to a second storage adapter supporting a second protocol for the cable sidebands. Moreover, I/O bay and port numbers stored by the microbay are used to determine miscabling.

18 Claims, 12 Drawing Sheets

(56) References Cited

U.S. PATENT DOCUMENTS

2016/0147628 A1    5/2016  Arroyo et al.
2016/0170929 A1    6/2016  Pethe et al.
2016/0321200 A1*  11/2016  Long .................. G06F 13/1668

OTHER PUBLICATIONS

Mell et al., "Effectively and Securely Using the Cloud Computing Paradigm", dated Oct. 7, 2009, NIST, Information Technology Laboratory, Total 80 pages.

Mell et al., "The NIST Definition of Cloud Computing", dated Sep. 2011, Recommendations of the National Institute of Standards and Technology, Total 7 pages.

* cited by examiner

DETECTING A TYPE OF STORAGE ADAPTER CONNECTED AND MISCABLING OF A MICROBAY HOUSING THE STORAGE ADAPTER

FIELD

Embodiments of the invention relate to detecting a type of storage adapter connected to an Input/Output (I/O) bay and miscabling of a microbay housing the storage adapter.

BACKGROUND

A storage controller manages physical disk drives and presents them to a host computer as logical units. The storage controller may include an I/O bay with two ports that are each coupled to a microbay housing a storage adapter.

There may be difficulty detecting whether the I/O bay is coupled to a microbay storing a current storage adapter or coupled to a different storage enclosure storing a previous Redundant Array of Inexpensive Disks (RAID) adapter. The RAID adapter is used for accessing RAID storage. In particular, the two ports in the I/O bay are the same ports used in a previous version of the storage controller for a previous RAID adapter (i.e., a different type of storage adapter). In the previous version of the storage controller, the two ports on the I/O bay are connected to the previous version of the RAID adapters, which are embedded within the previous model storage enclosure, instead of the microbays.

Also, there may be difficulty determining whether the I/O bay ports are coupled to the correct microbays or whether there has been miscabling. In particular, there is a possibility of miscabling with the introduction of the new microbay. Within an I/O bay, the cables coming from the I/O bay's ports designated for a storage adapter connection may be connected to the wrong microbay as a result of a mistake made during replacement of an I/O bay or during machine install.

SUMMARY

Provided is a computer program product for detecting a type of storage adapter connected to an Input/Output (I/O) bay and miscabling of a microbay housing the storage adapter. The computer program product comprises a computer readable storage medium having program code embodied therewith, the program code executable by at least one processor to perform: under control of an Input/Ouput (I/O) bay, driving cable sidebands high for a predetermined period of time; determining whether a cable sidebands response has been detected that indicates that the cable sidebands have been driven low; in response to determining that the cable sidebands response has been detected, determining that the I/O bay is connected to a first storage adapter supporting a first protocol for the cable sidebands; and, in response to determining that the cable sidebands response has not been detected, determining that the I/O bay is connected to a second storage adapter supporting a second protocol for the cable sidebands.

Provided is a computer system for detecting a type of storage adapter connected to an Input/Output (I/O) bay and miscabling of a microbay housing the storage adapter. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: under control of an Input/Ouput (I/O) bay, driving cable sidebands high for a predetermined period of time; determining whether a cable sidebands response has been detected that indicates that the cable sidebands have been driven low; in response to determining that the cable sidebands response has been detected, determining that the I/O bay is connected to a first storage adapter supporting a first protocol for the cable sidebands; and, in response to determining that the cable sidebands response has not been detected, determining that the I/O bay is connected to a second storage adapter supporting a second protocol for the cable sidebands.

Provided is a method for detecting a type of storage adapter connected to an Input/Output (I/O) bay and miscabling of a microbay housing the storage adapter. The method comprises: under control of an Input/Ouput (I/O) bay, driving cable sidebands high for a predetermined period of time; determining whether a cable sidebands response has been detected that indicates that the cable sidebands have been driven low; in response to determining that the cable sidebands response has been detected, determining that the I/O bay is connected to a first storage adapter supporting a first protocol for the cable sidebands; and, in response to determining that the cable sidebands response has not been detected, determining that the I/O bay is connected to a second storage adapter supporting a second protocol for the cable sidebands.

Moreover, an I/O bay number and an I/O bay port number stored by the microbay are used to determine miscabling.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
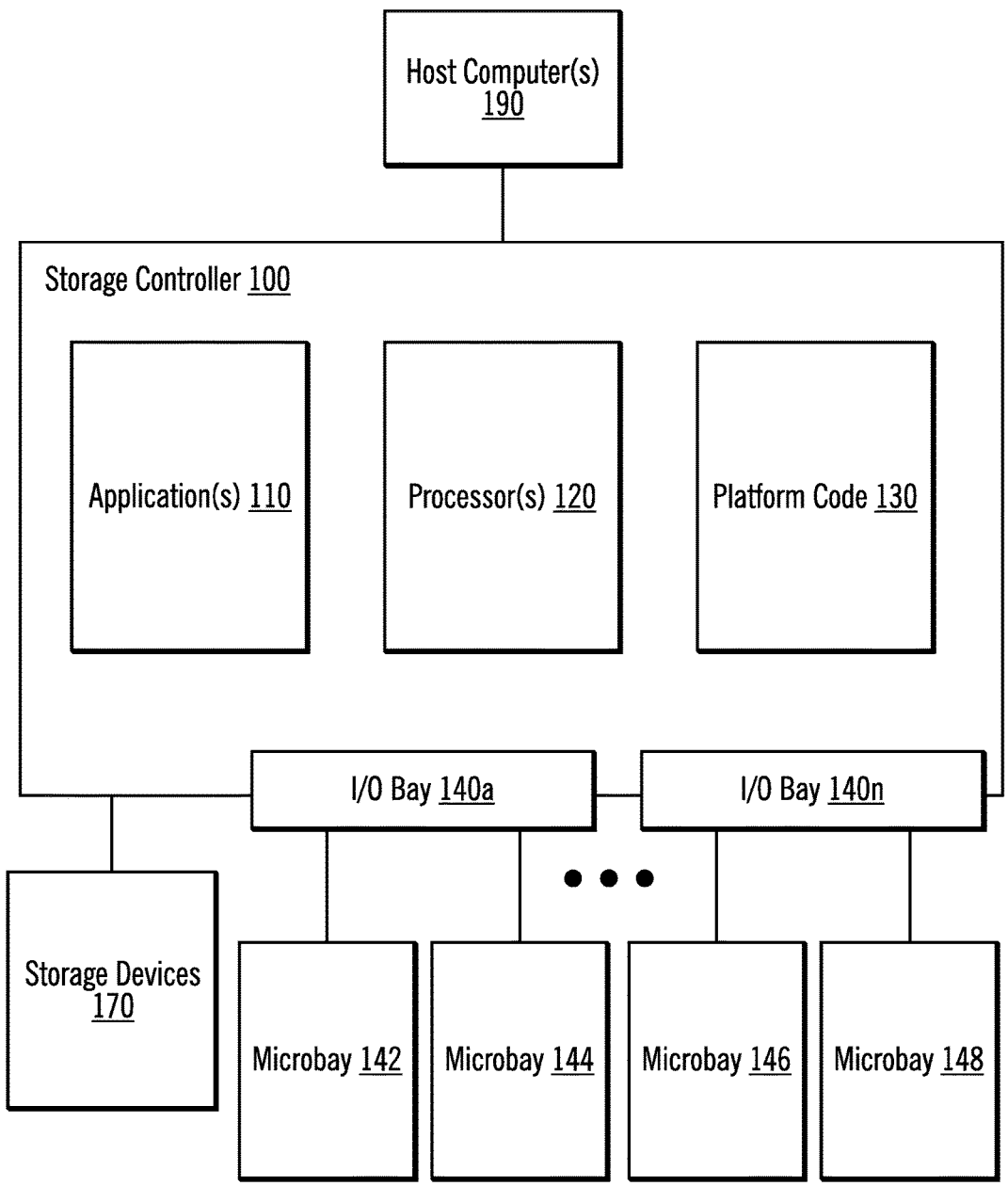
FIG. 1 illustrates, in a block diagram, a computing environment in accordance with certain embodiments.

FIG. 1 illustrates, in a block diagram, a computing environment in accordance with certain embodiments. In FIG. 1, a storage controller 100 is coupled to storage devices 170 and one or more host computers 190. The storage devices 170 may be Direct Access Storage Devices (DASDs). DASDs may be described as storage devices in which each physical record has a discrete location and a unique address. DASDs include, for example, disk drives, magnetic drums, data cells, and optical disc drives.

The storage controller 100 includes applications 110, one or more processors 120, and platform code 130. The storage controller 100 provides the host devices 190 access to data stored on the storage devices 170. The storage controller 100 presents the storage devices 170 to the host computers 190 as logical units.

The storage controller 100 also includes Input/Output (I/O) bays 140a . . . 140n. With embodiments, the storage controller 100 may include one or more I/O bays 140a . . . 140n. In certain embodiments, the storage controller 100 may include 2-8 I/O bays. Each of the I/O bays 140a . . . 140n is coupled to two microbays. For example, I/O bay 140a is coupled to microbays 142, 144, while I/O bay 140n is coupled to microbays 146, 148.

With embodiments, the storage controller 100 uses unique hardware to encase a storage adapter outside of the I/O bay 140a . . . 140n. In certain embodiments, the storage adapter is a RAID adapter (or "RAID adapter card") for accessing Redundant Array of Inexpensive Disks (RAID) storage. This new external hardware designed to enclose the RAID adapter is called a microbay. Each I/O bay 140a . . . 140n may connect to as many as two microbays via cabling. In certain embodiments, the cabling is Peripheral Component Interconnect Express (PCIe) cabling. PCIe may be described as a high-speed serial computer expansion bus standard.

Figure 2:
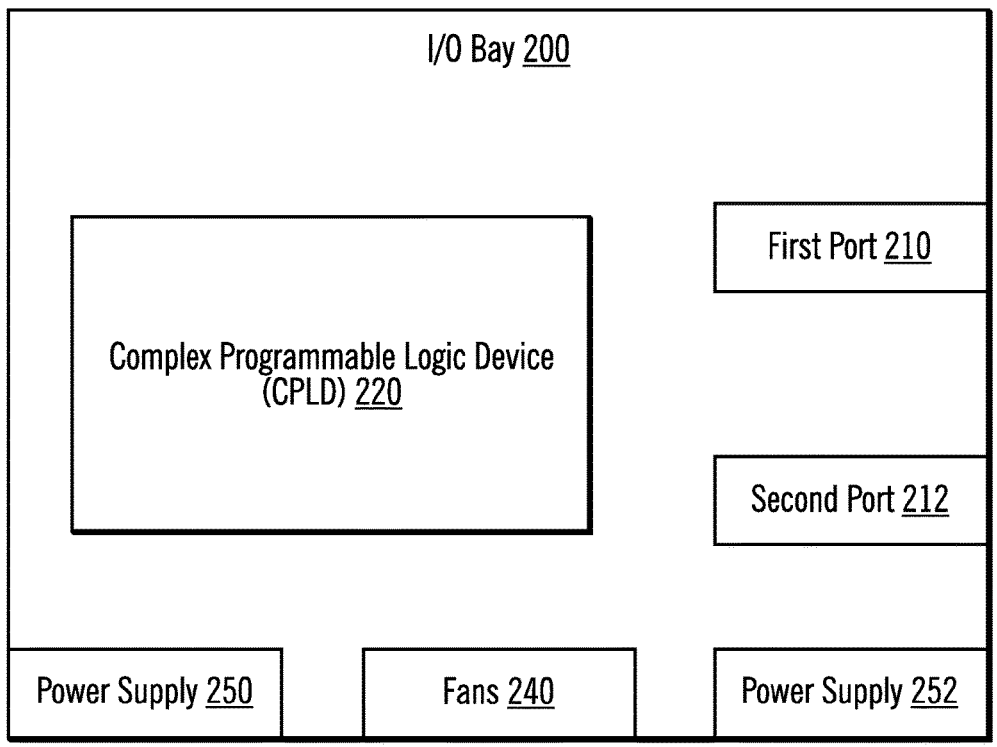
FIG. 2 illustrates, in a block diagram, details of an I/O bay in accordance with certain embodiments.

FIG. 2 illustrates, in a block diagram, details of an I/O bay 200 in accordance with certain embodiments. The I/O bays 140a . . . 140n may include the components of I/O bay 200. The I/O bay 200 includes a Complex Programmable Logic Device (CPLD) 220, a first port 210 for coupling with a microbay, a second port 212 for coupling with another microbay, fans 240, and power supplies 250, 252. The fans 240 are for cooling. The storage controller 100 uses each of the ports 210, 212 to connect to a storage adapter, which is outside the storage enclosure and encased in a microbay. With embodiments, an I/O bay slot may be described as a physical slot within the I/O bay into which an adapter card can slide. Also, an I/O bay port may be described as a port on the I/O bay where an external adapter that is encased within another enclosure (microbay or storage enclosure) may be cabled into (i.e., may be plugged into the port).

Figure 3:
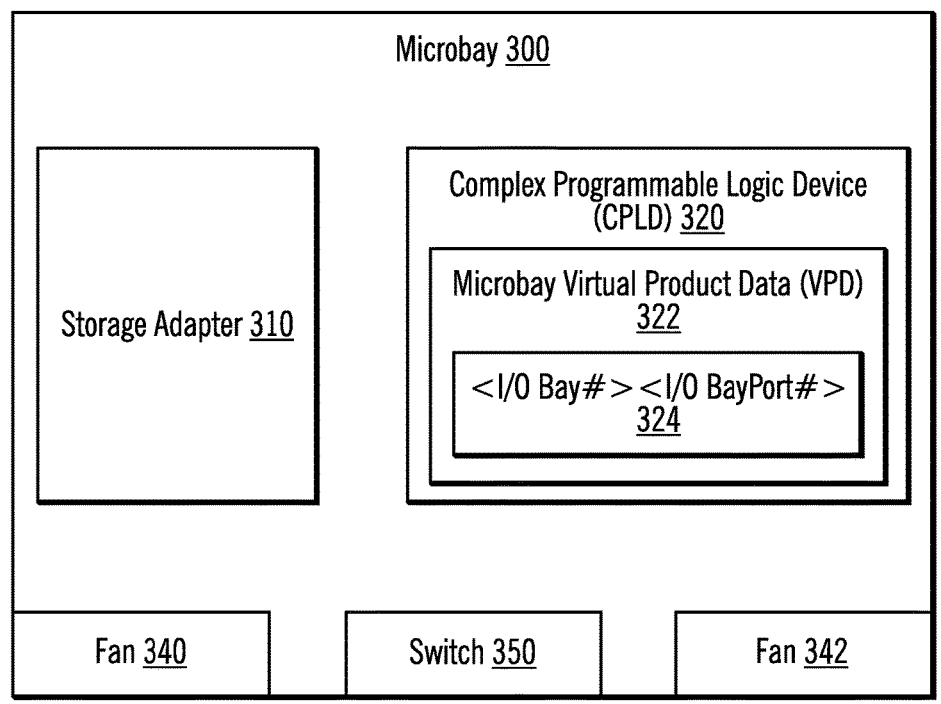
FIG. 3 illustrates, in a block diagram, details of a microbay in accordance with certain embodiments.

FIG. 3 illustrates, in a block diagram, details of a microbay 300 in accordance with certain embodiments. The microbays 142, 144, 146, and 148 may include the components of I/O bay 300. The microbay 300 stores a storage adapter 310. Also, the microbay 300 includes a Complex Programmable Logic Device (CPLD) 320, fans 340, 342, and switch 350. In certain embodiments, the switch 350 is a PLX switch. In particular, PCIe is a point-to-point serial interconnect standard, it requires a switch to connect a single PCIe port of the I/O bay to multiple microbays. The storage adapter 310 may be a RAID adapter. The fans 340 are for cooling. The CPLD 320 includes Microbay Virtual Product Data (VPD) 322, which specifies an I/O bay number and an I/O bay port number of the I/O bay 324 (<I/O Bay#><I/O Bay Port#>).

Embodiments herein are applicable to detecting a difference between two storage adapters: a first storage adapter that uses the PCIe protocol over the sidebands and a second storage adapter that uses the I2C protocol over the sidebands.

With embodiments, when an I/O bay is going through its adapter discovery process and it is discovering what is in a port reserved for a RAID adapter, the I/O bay will drive the PCIe power and platform reset (PERST) sidebands high for a determined amount of time. If the PCIe cable is attached to the storage adapter that uses the PCIe protocol for supporting sidebands (e.g., an older model of the RAID adapter), there will be no response on the PCIe sidebands from the RAID adapter, and the I/O bay knows that the I/O bay is attached to the previous storage adapter. However, if the PCIe cable is attached to a storage adapter that uses the I2C protocol over the sidebands, there will be a response, and the I/O bay knows that the I/O bay is attached to a microbay (which supports the I2C protocol).

In particular, the PCIe Power and Platform Reset lines are two specific wires within the PCIe cable. Embodiments use these two lines to repurpose them to be used for the I2C protocol. The I2C protocol uses two wires to communicate: a clock line and a data line. Once it is known that there is a microbay installed, the PCIe Power line and PERST line are used for the I2C protocol. Thus, embodiments are able to use a PCIe cable to communicate in two ways (PCIe protocol and I2C protocol). When there is a need to reset or power cycle the storage adapter within the microbay, embodiments do that by simply sending messages across the I2C protocol and the CPLD 320 within the microbay will do the reset/power cycle of the storage adapter.

If the PCIe cable is attached to the new microbay, the behavior of the PCIe power and PERST sidebands will be different. After the I/O bay drives the power and PERST sidebands for the determined amount of time, the microbay will respond by driving the same sidebands high. The I/O bay will recognize that this means separate logic apart from its own is driving the sidebands high. This allows the I/O bay to know it is attached to a microbay. At this point the I/O bay will start communicating with the microbay across the PCI sidebands using I2C protocol.

Once the I2C communication is established between the I/O bay and microbay, the ability to write to the microbay's CPLD is achieved. This allows for the microbay VPD to be written to a value that corresponds to the I/O bay, along with the I/O bay's port. This is done during the manufacturing process when the storage controller is being built. Once the microbay has this VPD written, the platform code 130 is able to recognize a future miscable. This is possible because during discovery when the storage controller is initializing, platform code 130 will know what microbay VPD to expect given the I/O bay port it is configuring. If the VPD does not match the I/O bay and port number, the platform code 130 will flag the miscable. That is, the platform code 130 knows which bay port it is configuring and so the platform code 130 knows which microbay should be connected to a given port.

Figure 4:
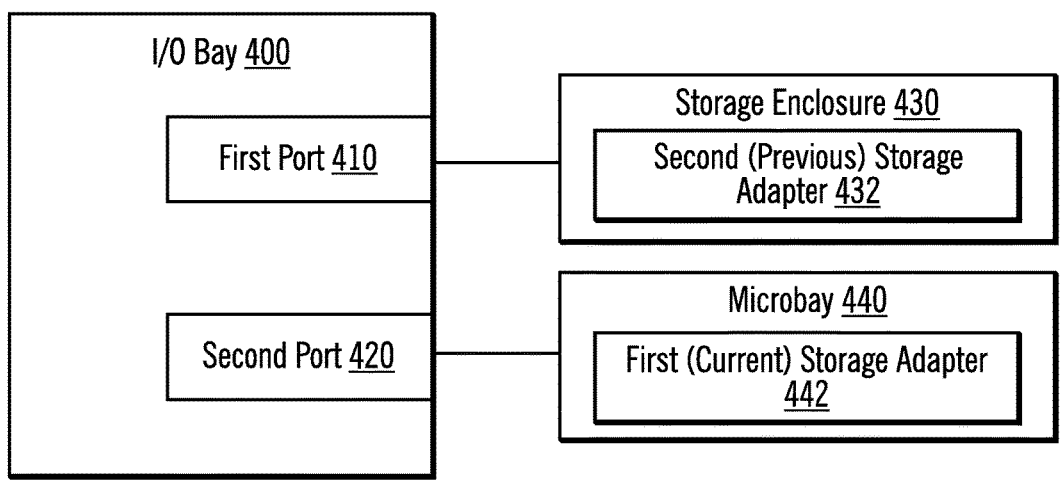
FIG. 4 illustrates an I/O bay coupled to a first storage adapter and a second storage adapter in accordance with certain embodiments.

FIG. 4 illustrates an I/O bay coupled to a first (current or newer) storage adapter and a second (previous or older) storage adapter in accordance with certain embodiments. In particular, first port 410 of the I/O bay 400 is coupled to a second storage adapter 432 housed in a storage enclosure 430 (which may not be a microbay). Also, the second port 420 of the I/O bay 400 is coupled to a new storage adapter 442 housed in a microbay 440 (which is a new type of storage enclosure). Embodiments determine whether the I/O bay is attached to the second storage adapter 432 that is embedded in the storage enclosure 430 or the first storage adapter 442 enclosed within the microbay 440. With embodiments, the first storage adapter 442 uses a first protocol (e.g., the I2C protocol) for the sidebands, and the second storage adapter 432 uses a second protocol (e.g., the PCIe protocol) for the sidebands.

Figure 5:
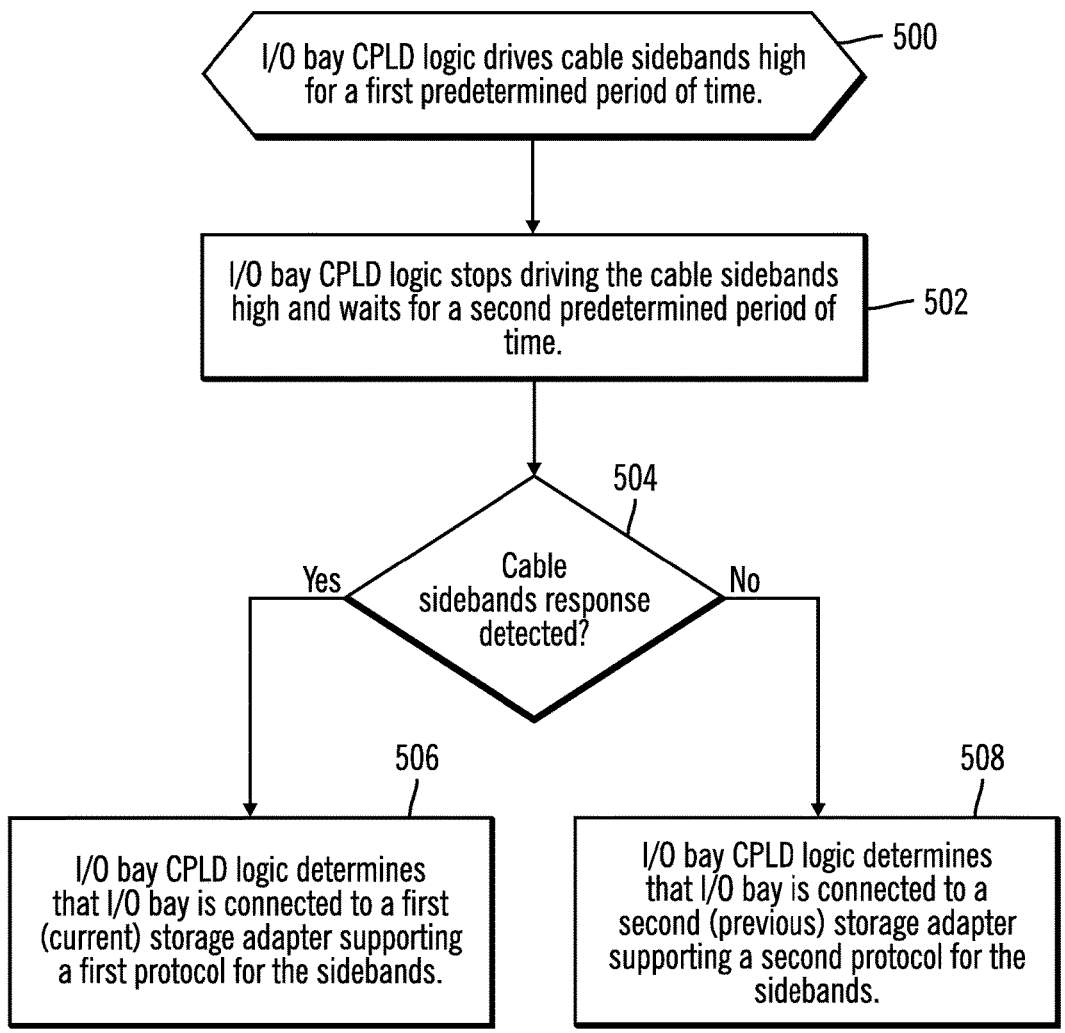
FIG. 5 illustrates, in a flow chart, operations for determining whether an I/O bay is coupled to a first storage adapter or a second storage adapter in accordance with certain embodiments.

FIG. 5 illustrates, in a flow chart, operations for determining whether an I/O bay is coupled to a first (current or newer) storage adapter or a second (previous or older) storage adapter in accordance with certain embodiments. Control begins at block 500 with the I/O bay CPLD 220 logic driving cable (e.g., PCIe cable) sidebands high for a first predetermined period of time. In certain embodiments, when the cable is a PCIe cable, the PCIe power and platform reset (PERST) sidebands are driven high. With embodiments, the first predetermined amount of time may be preset in the CPLD logic, but the first predetermined amount of time may be changed (increased or decreased) with a CPLD image update.

With embodiments, the sidebands are sideband signals that include:

Reference Clock (CREFCLKp, CREFCLKn): 100 Mhz reference clock, used to implement spread-spectrum clocking over the bus.

Cable Present (CPERST#): Signals that the cable is connected between two systems.

Platform Reset (CPERST#): Allows the upstream host to reset the downstream sub-system.

Cable Power On (CPWRON#): Allows the upstream host to turn on the downstream sub-system's power.

Sideband Return (SB_RTN): The electrical return for the sideband signals 3.3V Power (+3.3V POWER, PWR_RTN): Provides power to the PCIe cable connector to power active components within the connector.

In block 502, the I/O bay CPLD 220 logic stops driving the cable sidebands high and waits for a second predetermined period of time. With embodiments, the second predetermined amount of time may be preset in the CPLD logic, but the second predetermined amount of time may be changed (increased or decreased) with a CPLD image update. In block 504, the I/O bay CPLD 220 logic determines whether a cable sidebands response has been detected after waiting the second predetermined amount of time. The response comes from the storage adapter. If so, processing continues to block 506, otherwise, processing continues to block 508.

In block 506, the I/O bay CPLD 220 logic determines that the I/O bay is connected to a first (current or newer) storage adapter supporting a first protocol for the sidebands. In certain embodiments, when the microbay detects that the cable sidebands were driven high, the microbay drives the cable sidebands low, and this is the cable sidebands response that is detected. In block 508, the I/O bay CPLD 220 logic determines that the I/O bay is connected to a second (previous or older) storage adapter supporting a second protocol for the sidebands.

Figure 6:
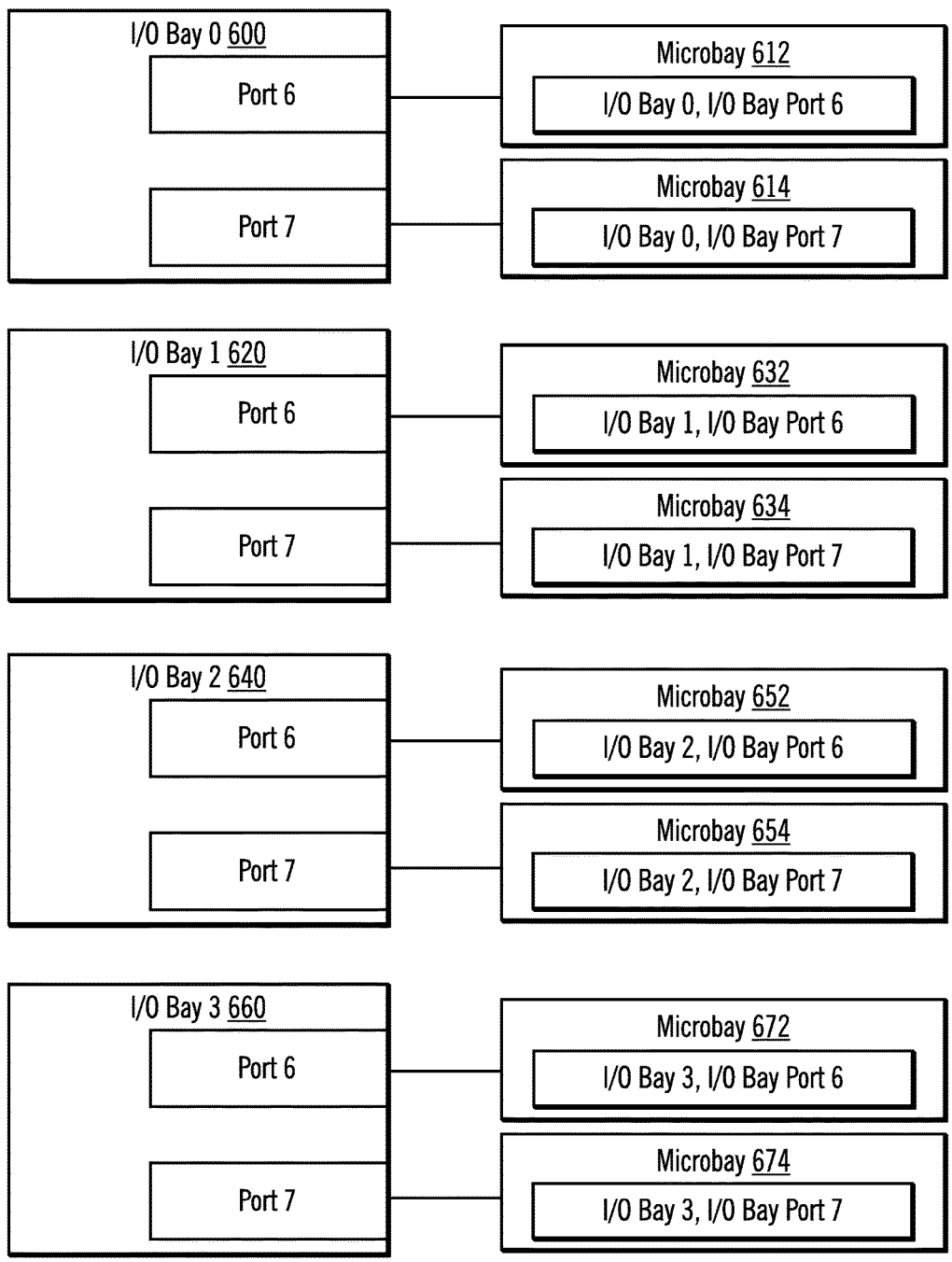
FIG. 6 illustrates four IO bays connected to eight microbays after a discovery process during manufacturing of a storage controller in accordance with certain embodiments.

Embodiments determine whether miscabling has occurred from an I/O bay to a microbay. FIG. 6 illustrates four 10 bays connected to eight microbays after a discovery process during manufacturing of a storage controller in accordance with certain embodiments. For example, I/O bays 600, 620, 640, 660 each have a first port with I/O bay port number 6 and a second port with I/O bay port number 7. Each microbay has VPD that indicates the I/O bay number and I/O bay port number to which that microbay is connected.

In particular, port 6 of I/O bay 0 600 is coupled to microbay 612, which indicates a microbay VPD of I/O bay 0 and port 6. Port 7 of I/O bay 0 600 is coupled to microbay 614, which indicates a microbay VPD of I/O bay 0 and port 7.

Port 6 of I/O bay 1 620 is coupled to microbay 632, which indicates a microbay VPD of I/O bay 1 and port 6. Port 7 of I/O bay 1 620 is coupled to microbay 634, which indicates a microbay VPD of I/O bay 1 and port 7.

Port 6 of I/O bay 2 640 is coupled to microbay 652, which indicates a microbay VPD of I/O bay 2 and port 6. Port 7 of I/O bay 2 640 is coupled to microbay 614, which indicates a microbay VPD of I/O bay 2 and port 7.

Port 6 of I/O bay 3 660 is coupled to microbay 672, which indicates a microbay VPD of I/O bay 3 and port 6. Port 7 of I/O bay 3 660 is coupled to microbay 674, which indicates a microbay VPD of I/O bay 3 and port 7.

With embodiments, I/O bay system management code determines the numbering of the I/O bays and ports.

Figure 7:
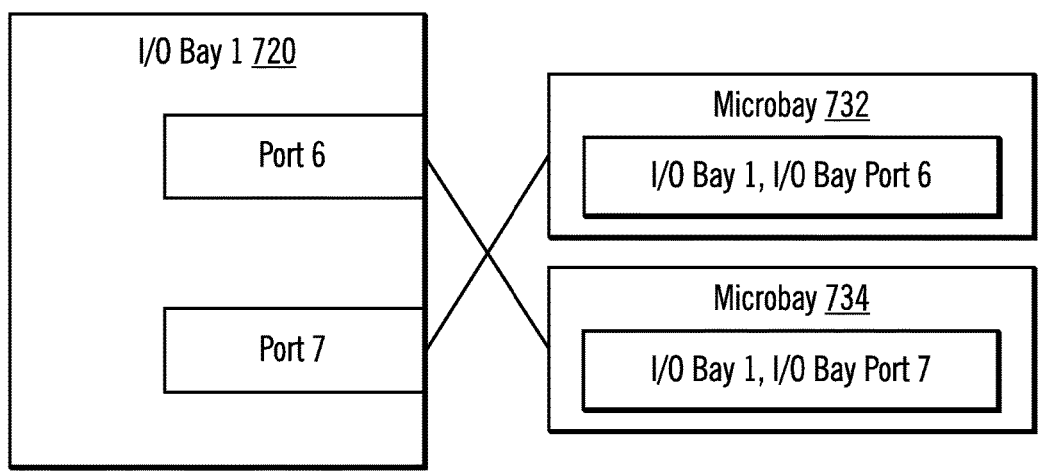
FIG. 7 illustrates an I/O bay that is incorrectly cabled to a microbay in accordance with certain embodiments.

FIG. 7 illustrates an I/O bay that is incorrectly cabled to a microbay in accordance with certain embodiments. Port 6 of I/O bay 1 720 is incorrectly coupled to microbay 732, which indicates a microbay VPD of I/O bay 1 and port 7. Port 7 of I/O bay 1 720 is coupled to microbay 734, which indicates a microbay VPD of I/O bay 1 and port 6. With embodiments, during the repair process, before the I/O bay is brought back online, platform code 130 reads the microbay VPD of the microbay behind port 6 and finds value 7. The platform code 130 immediately detects the discrepancy and fails the repair for miscable.

Figure 8:
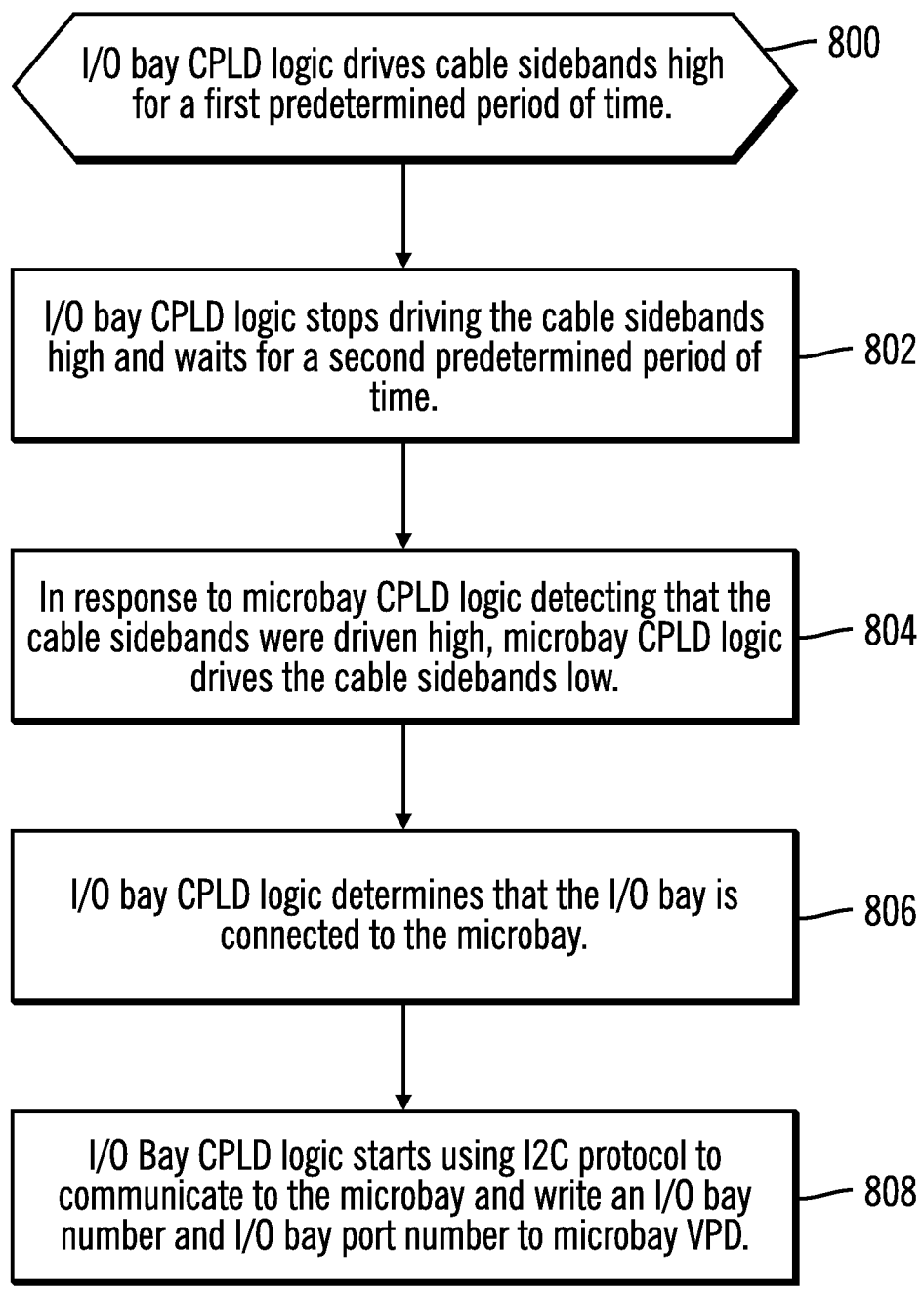
FIG. 8 illustrates, in a flow chart, operations for discovery in accordance with certain embodiments.

FIG. 8 illustrates, in a flow chart, operations for discovery in accordance with certain embodiments. Control begins at block 800 with the I/O bay CPLD 220 logic driving cable (e.g., PCIe cable) sidebands high for a first predetermined period of time. In certain embodiments, when the cable is a PCIe cable, the PCIe power and platform reset (PERST) sidebands are driven high. With embodiments, the first predetermined amount of time may be preset in the CPLD logic, but the first predetermined amount of time may be changed (increased or decreased) with a CPLD image update.

In block 802, the I/O bay CPLD 220 logic stops driving the cable sidebands high and waits for a second predetermined period of time. With embodiments, the second predetermined amount of time may be preset in the CPLD logic, but the second predetermined amount of time may be changed (increased or decreased) with a CPLD image update.

In block 804, in response to the microbay CPLD 320 logic detecting that the cable sidebands were driven high, the microbay CPLD 320 logic drives the cable sidebands low. In block 806, in response to the I/O bay CPLD 220 logic detecting that the cable sidebands have been driven low by the microbay, the I/O bay CPLD 220 logic determines that the I/O bay is connected to the microbay. In block 808, the I/O Bay CPLD logic starts using I2C protocol to communicate to the microbay and to write I/O bay number and I/O bay port number to the microbay VPD. With embodiments, in the manufacturing process, once the I/O bay is communicating I2C with the microbay, the I/O bay CPLD 220 logic initiates a write to the Microbay VPD with the I/O bay logical number and a logical I/O bay port number of the same I/O bay to which the cable is connected.

The operations of FIG. 8 occur when the I/O bay is connected to a microbay that houses the storage adapter capable of supporting the I2C protocol over the sidebands.

Figure 9:
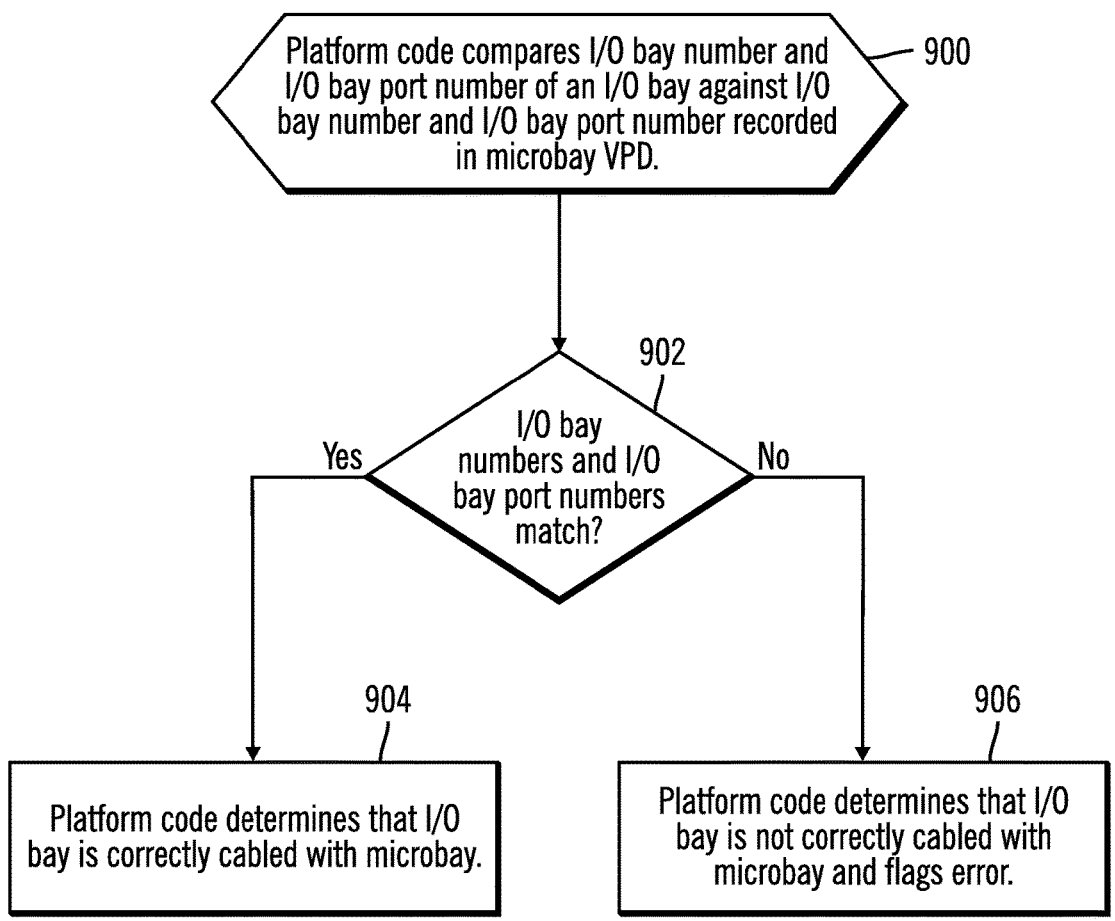
FIG. 9 illustrates, in a flow chart, operations for determining miscabling in accordance with certain embodiments.

FIG. 9 illustrates, in a flow chart, operations for determining miscabling in accordance with certain embodiments. Control begins at block 900 with the platform code 130 comparing an I/O bay number and an I/O bay port number of an I/O bay against an I/O bay number and an I/O bay port number written to a microbay VPD. In block 902, the platform code 130 determines whether the I/O bay numbers and the I/O bay port numbers match. If so, processing continues to block 904, otherwise, processing continues to block 906. In block 904, the platform code 130 determines that the I/O bay is correctly cabled with the microbay. In block 906, the platform code 130 determines that I/O bay is not correctly cabled with microbay and flags an error.

In certain embodiments, the cable discussed in FIG. 8 is a PCIe cable. Thus, embodiments utilize an I2C protocol across a PCIe interface to enable the detection of a PCIe miscable.

With embodiments, the sideband communication is I2C protocol. In addition, embodiments employ a unique handshaking technique across the PCIe sidebands between upstream PCIe devices (e.g., I/O bay) and downstream PCIe devices (e.g., storage adapter), allowing for logic to determine whether the upstream PCIe device is connected to a previous version or a latest version of downstream PCIe device.

In a PCIe interface, embodiments provide a technique of conducting discovery of specific connected devices without changing standard protocols by driving sideband channels to detect the specific storage adapter.

Figure 10:
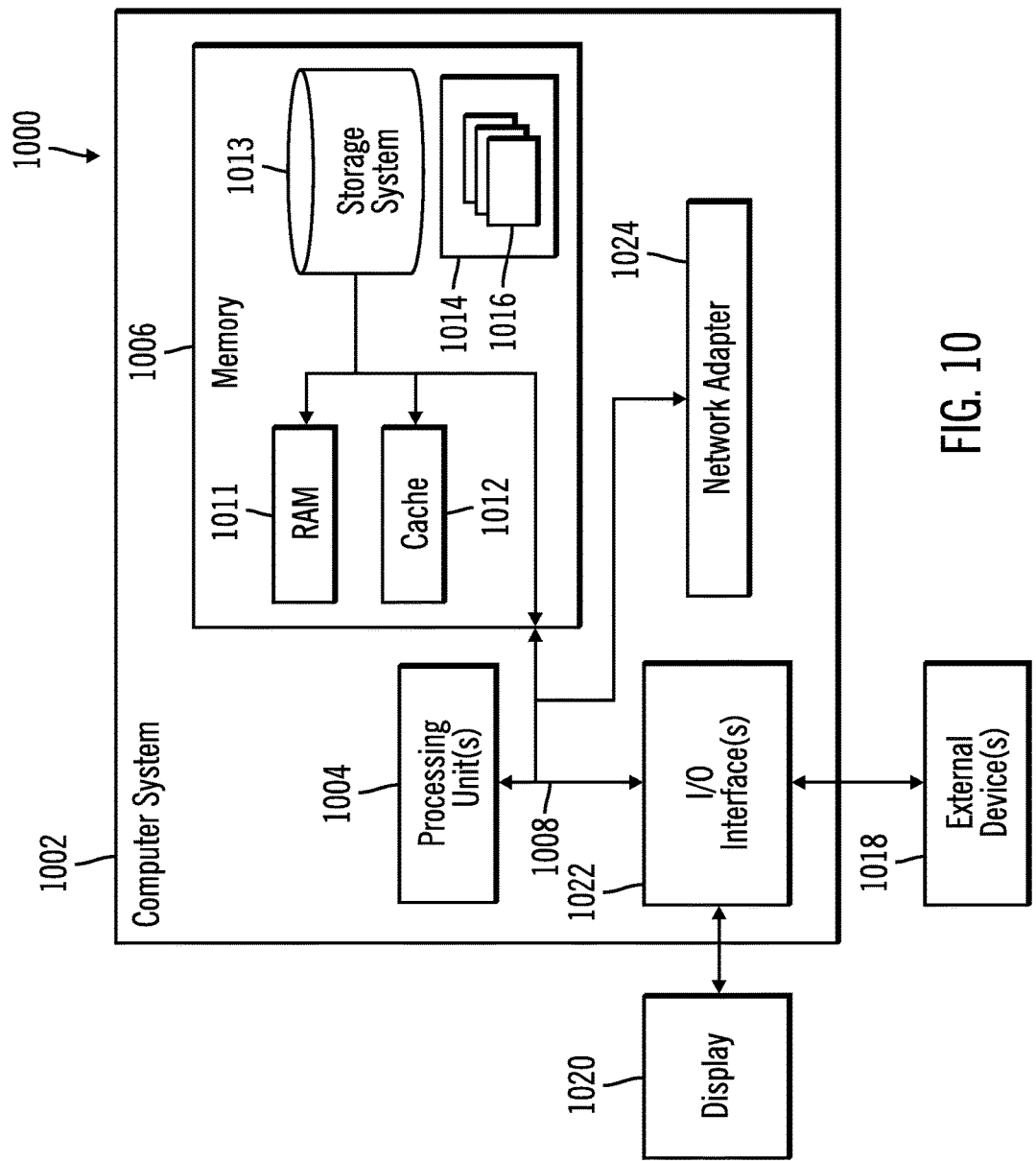
FIG. 10 illustrates a computing architecture in which the components of FIG. 1 may be implemented.

FIG. 10 illustrates a computing architecture in which the components of FIG. 1 may be implemented. In certain embodiments, the storage controller 100 and/or hosts 190 may implement computer architecture 1000.

Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1011 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
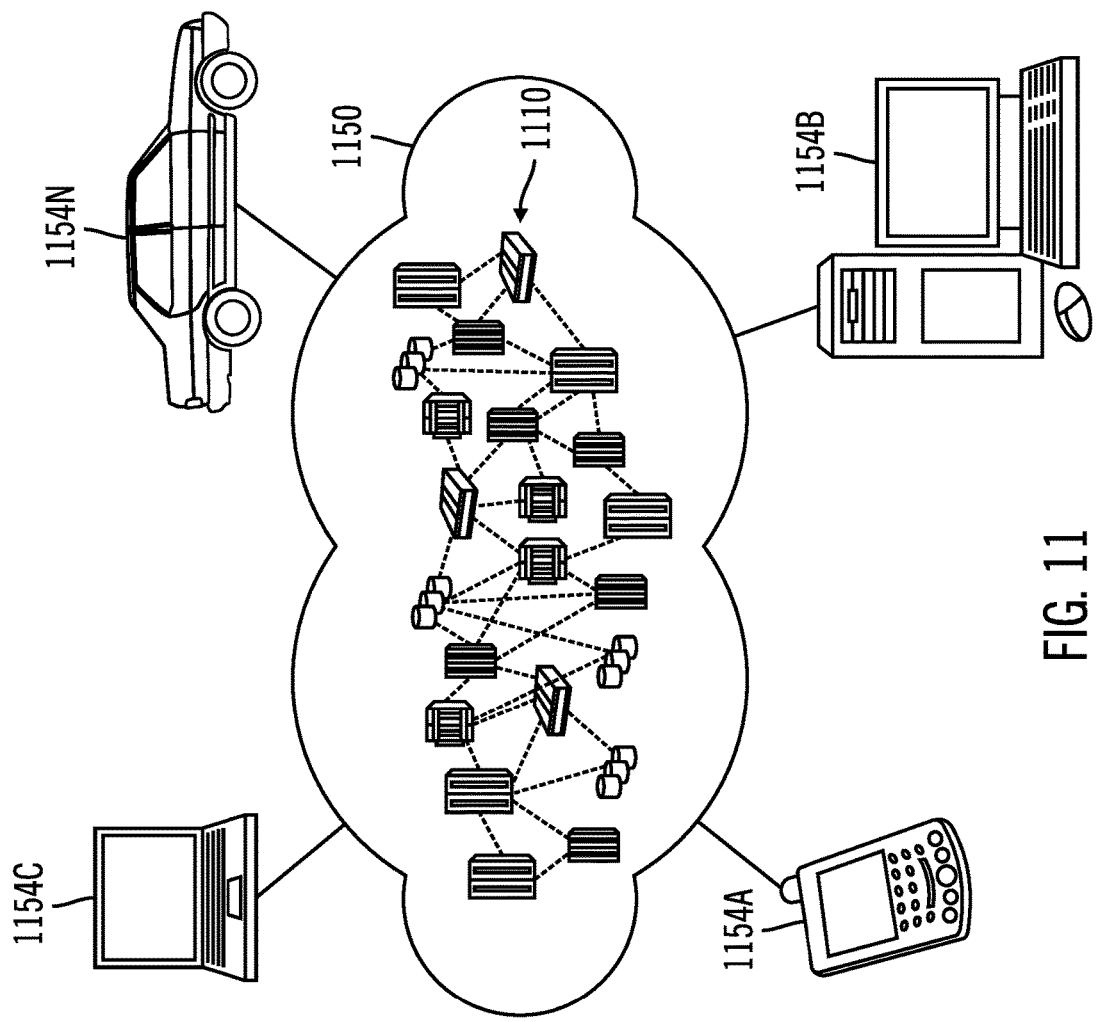
FIG. 11 illustrates a cloud computing environment according to an embodiment of the present invention.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
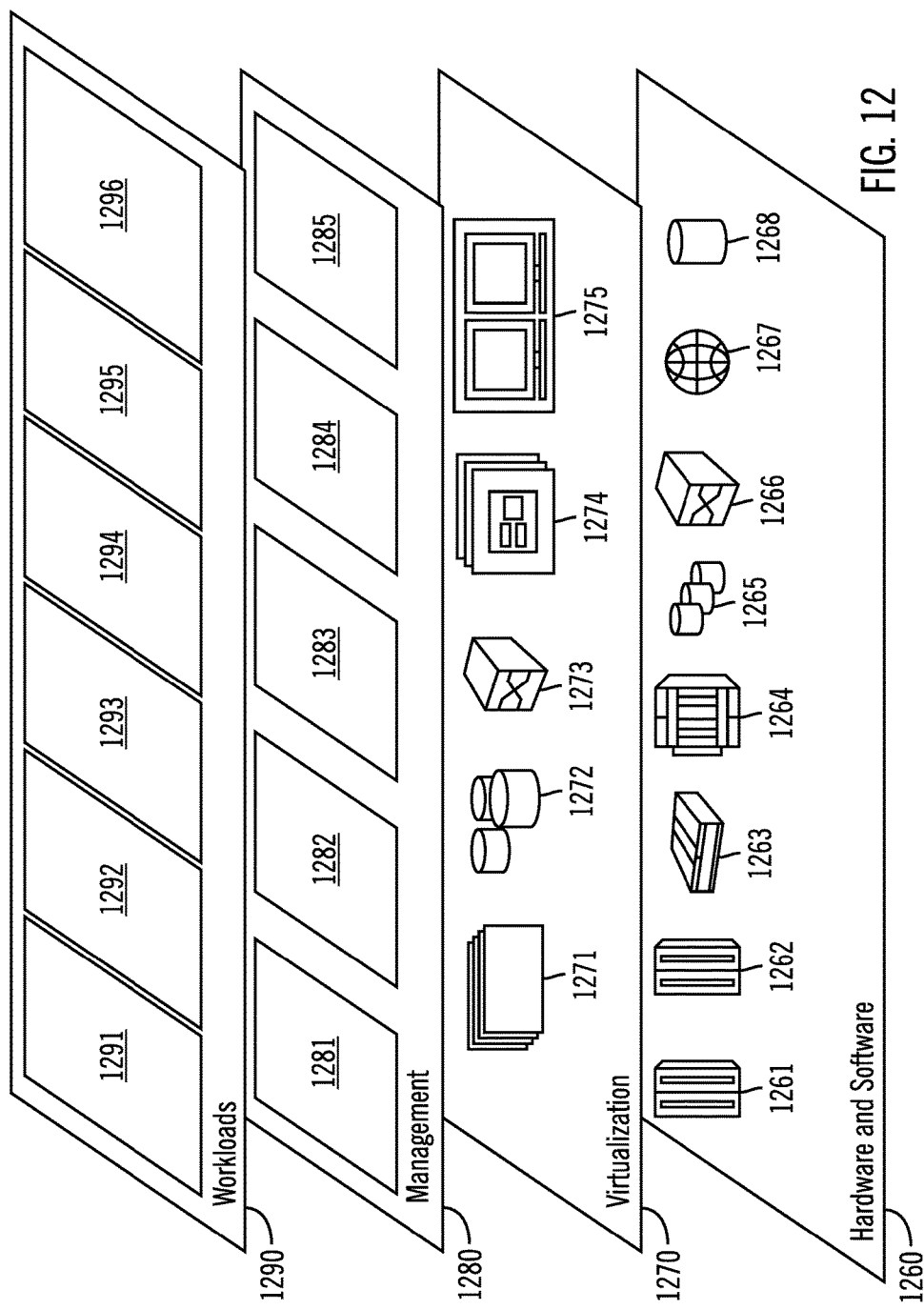
FIG. 12 illustrates abstraction model layers according to an embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and detecting a type of storage adapter connected to an Input/Ouput (I/O) bay and miscabling of a microbay housing the storage adapter 1296.

Thus, in certain embodiments, software or a program, implementing detecting a type of storage adapter connected to an Input/Output (I/O) bay and miscabling of a microbay housing the storage adapter in accordance with embodiments described herein, is provided as a service in a cloud infrastructure.

In certain embodiments, the storage controller 120 is part of a cloud infrastructure. In other embodiments, the storage controller 120 is not part of a cloud infrastructure.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
    under control of an Input/Output (I/O) bay,
        driving cable sidebands of a cable high for a first predetermined period of time;
        waiting for a second predetermined period of time;
        determining whether a cable sidebands response has been detected that indicates that the cable sidebands have been driven low;
        in response to determining that the cable sidebands response has been detected that indicates that the cable sidebands have been driven low,
            determining that the I/O bay is connected to a first storage adapter housed in a microbay; and
            communicating, through the cable, with the first storage adapter using a first protocol for the cable sidebands; and
        in response to determining that the cable sidebands response has not been detected,
            determining that the I/O bay is connected to a second storage adapter; and
            communicating, through the cable, with the second storage adapter using a second protocol for the cable sidebands.

2. The computer program product of claim 1, wherein the I/O bay is coupled to the microbay, and wherein the microbay drives the cable sidebands low.

3. The computer program product of claim 1, wherein the program code is executable by at least one processor to perform:

writing an I/O bay number and an I/O bay port number to a microbay.

4. The computer program product of claim 3, wherein the I/O bay number and the I/O bay port number are stored in Virtual Product Data (VPD) of the microbay.

5. The computer program product of claim 3, wherein the program code is executable by at least one processor to perform:
comparing an I/O bay number and an I/O bay port number of the I/O bay against the I/O bay number and the I/O bay port number written to the microbay to determine whether there is a match;
in response to determining that there is a match, determining that the I/O bay is correctly cabled with the microbay; and
in response to determining that there is no match, determining that the I/O bay is not correctly cabled with the microbay.

6. The computer program product of claim 1, wherein the I/O bay is coupled to a storage controller that comprises a node in a cloud infrastructure.

7. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
under control of an Input/Output (I/O) bay,
driving cable sidebands of a cable high for a first predetermined period of time;
waiting for a second predetermined period of time;
determining whether a cable sidebands response has been detected that indicates that the cable sidebands have been driven low;
in response to determining that the cable sidebands response has been detected that indicates that the cable sidebands have been driven low,
determining that the I/O bay is connected to a first storage adapter housed in a microbay; and
communicating, through the cable, with the first storage adapter using a first protocol for the cable sidebands; and
in response to determining that the cable sidebands response has not been detected,
determining that the I/O bay is connected to a second storage adapter; and
communicating, through the cable, with the second storage adapter using a second protocol for the cable sidebands.

8. The computer system of claim 7, wherein the I/O bay is coupled to the microbay, and wherein the microbay drives the cable sidebands low.

9. The computer system of claim 7, wherein the operations further comprise:
writing an I/O bay number and an I/O bay port number to a microbay.

10. The computer system of claim 9, wherein the I/O bay number and the I/O bay port number are stored in Virtual Product Data (VPD) of the microbay.

11. The computer system of claim 9, wherein the operations further comprise:
comparing an I/O bay number and an I/O bay port number of the I/O bay against the I/O bay number and the I/O bay port number written to the microbay to determine whether there is a match;
in response to determining that there is a match, determining that the I/O bay is correctly cabled with the microbay; and
in response to determining that there is no match, determining that the I/O bay is not correctly cabled with the microbay.

12. The computer system of claim 7, wherein the I/O bay is coupled to a storage controller that comprises a node in a cloud infrastructure.

13. A method, comprising:
under control of an Input/Output (I/O) bay,
driving cable sidebands of a cable high for a first predetermined period of time;
waiting for a second predetermined period of time;
determining whether a cable sidebands response has been detected that indicates that the cable sidebands have been driven low;
in response to determining that the cable sidebands response has been detected that indicates that the cable sidebands have been driven low,
determining that the I/O bay is connected to a first storage adapter housed in a microbay; and
communicating, through the cable, with the first storage adapter using a first protocol for the cable sidebands; and
in response to determining that the cable sidebands response has not been detected,
determining that the I/O bay is connected to a second storage adapter; and
communicating, through the cable, with the second storage adapter using a second protocol for the cable sidebands.

14. The method of claim 13, wherein the I/O bay is coupled to the microbay, and wherein the microbay drives the cable sidebands low.

15. The method of claim 13, further comprising:
writing an I/O bay number and an I/O bay port number to a microbay.

16. The method of claim 15, wherein the I/O bay number and the I/O bay port number are stored in Virtual Product Data (VPD) of the microbay.

17. The method of claim 15, further comprising:
comparing an I/O bay number and an I/O bay port number of the I/O bay against the I/O bay number and the I/O bay port number written to the microbay to determine whether there is a match;
in response to determining that there is a match, determining that the I/O bay is correctly cabled with the microbay; and
in response to determining that there is no match, determining that the I/O bay is not correctly cabled with the microbay.

18. The method of claim 13, wherein the I/O bay is coupled to a storage controller that comprises a node in a cloud infrastructure.

* * * * *